United States Patent [19]

Needham et al.

[11] 4,168,665
[45] Sep. 25, 1979

[54] COVERED HOPPER CAR CORRUGATED BOLSTER WEB CONSTRUCTION

[75] Inventors: Robert F. Needham; Robert W. Randolph, both of St. Charles, Mo.

[73] Assignee: ACF Industries, Incorporated, New York, N.Y.

[21] Appl. No.: 828,760

[22] Filed: Aug. 29, 1977

[51] Int. Cl.² .................. B61D 7/20; B61D 17/00; B61F 1/10; B61F 1/12

[52] U.S. Cl. ........................... 105/248; 105/406 R; 105/418; 105/420; 105/421; 213/57

[58] Field of Search ............... 105/247, 248, 249, 250, 105/251, 252, 253, 404, 406 R, 406 A, 409, 410, 411, 417, 418, 420, 421; 296/28 R, 28 D, 28 M; 298/24; 213/57

[56] References Cited

U.S. PATENT DOCUMENTS

| 401,530 | 4/1889 | Zurcher | 105/248 |
| 1,292,899 | 1/1919 | Slick | 105/406 R |
| 1,944,421 | 1/1934 | Gilpin | 105/249 |
| 2,019,304 | 10/1935 | Hallquist et al. | 105/249 |
| 2,865,309 | 12/1958 | Lich | 105/410 X |
| 3,391,445 | 7/1968 | Miller | 105/406 R X |
| 3,490,387 | 1/1970 | Halcomb | 105/248 |
| 3,572,252 | 3/1971 | Coover et al. | 105/250 X |
| 3,605,634 | 9/1971 | Johnson | 105/248 |

Primary Examiner—Stephen G. Kunin
Assistant Examiner—Howard Beltran
Attorney, Agent, or Firm—Henry W. Cummings

[57] ABSTRACT

In accordance with the present structure, in a railway hopper car a corrugated bolster web extends vertically between a bolster cover plate and the end hopper slope sheet. The vertically extending corrugations act as reinforcements in the web which web has at least some of the corrugations positioned over the side bearings and center plate.

16 Claims, 17 Drawing Figures

COVERED HOPPER CAR CORRUGATED BOLSTER WEB CONSTRUCTION

BACKGROUND OF THE INVENTION

This invention relates to end structure in a railway hopper car.

It is known in the railway car art to use corrugated members for the sides and ends of railway hopper cars. See for example U.S. Pat. Nos. 401,530 (1889); 1,292,899 (1919) having corrugated sides; and 2,865,309 (1958) having corrugated ends.

In U.S. Pat. No. 3,490,397 (1970) a stub sill railway hopper car is disclosed having a bolster web extending vertically from a transverse bolster cover plate to an end hopper slope sheet, and a pair of diagonal end struts which extend from an upper hopper bulkhead near the top of the car downwardly and inwardly to the stub sill. The moment generated by impact forces which tend to rotate the car downwardly is reacted by a couple including a compressive force in the bolster web and a tensile force in the diagonal end struts. This is a statically determinate structure which allows easy calculation of the impact and squeeze loadings of these members.

The bolster web is provided with channel reinforcements which are welded to the bolster web, to the bolster cover plate, and to the end hopper slope sheet.

Figure 5:
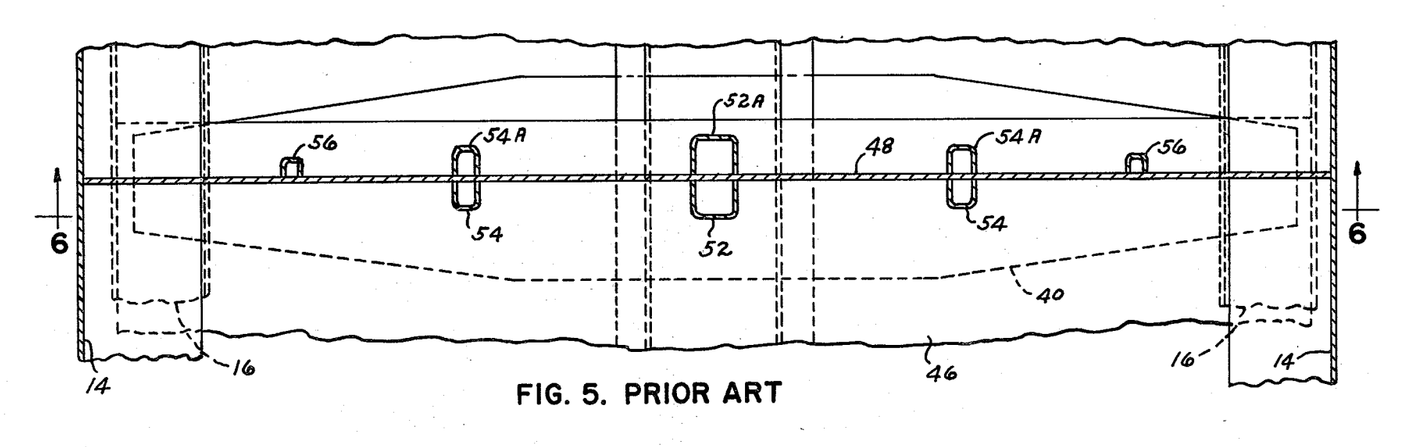
FIG. 5 is a section taken generally along line 5—5 of FIG. 1 and showing the prior art reinforced upper bolster web.
Figure 6:
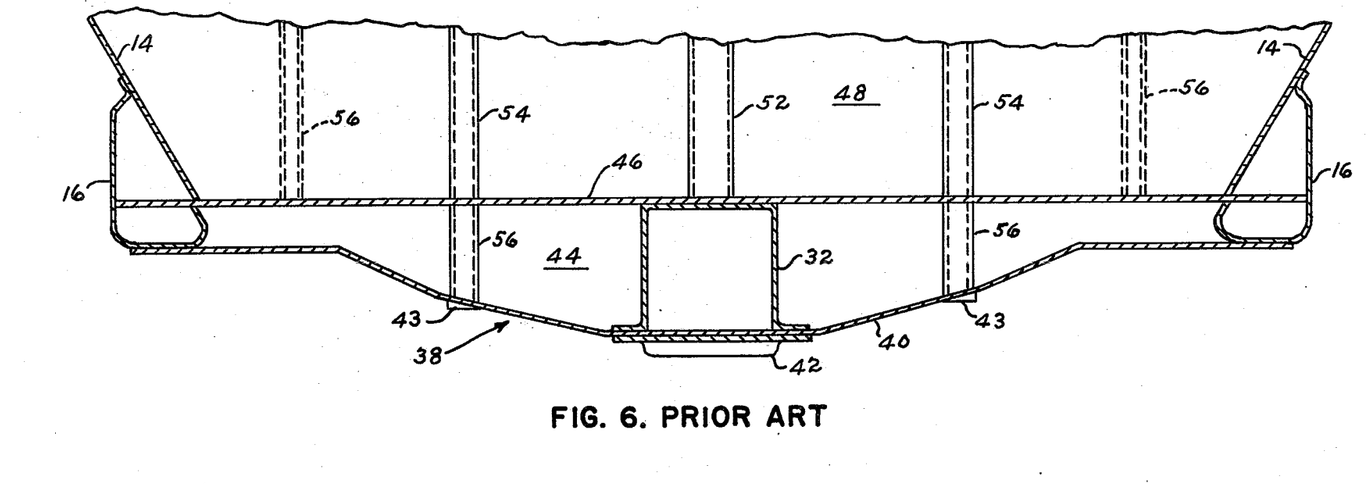
FIG. 6 is a section taken generally along line 6—6 of FIG. 5 and showing the bolster structure.

This welding incurs a substantial cost penalty. For example, a typical hopper car has a bolster web about four feet high. Using the reinforcements shown in FIG. 5 of this patent, this would amount to 16 channels per car. Using two welds, four feet long on each channel equates to about 128 feet of welding per car.

SUMMARY OF THE INVENTION

The object of the present invention is to provide a statically determinate hopper car end structure according to the teachings of U.S. Pat. No. 3,490,387 at reduced cost of production.

In accordance with the present invention the bolster web extending vertically between the bolster cover plate and the end hopper slope sheet and the bolster web reinforcements are replaced with a corrugated bolster web in which vertically extending corrugations act as reinforcements, resulting in a reduction in welding time and cost of production.

The corrugation located above the stub center sill of the car is preferably provided with a vertical closure plate to close the open side of the corrugation to provide a box section which is more resistant to buckling under compressive or columnar loads experienced in this area under impact conditions than the open section.

Vertical closure plates may also be welded to the open side of corrugations extending vertically above the side bearings because this area is also highly stressed, for example while resisting transverse rocking of the car.

A less expensive embodiment is to locate the web of the vertically extending corrugation above the side bearing parallel to the longitudinal axis of the car at or near the center line of the side bearing. This eliminates welding in place closure plates above the side bearings.

Another less expensive embodiment is to locate the corrugation web over the side bearing askew to the longitudinal center line of the bolster web. This does not require a closure plate, and allows the corrugations to have angularity which simplifies the corrugation forming operation.

The corrugated bolster web may be attached to the end floor sheet by coping the top of the corrugated web to match the slope of the end floor sheet.

However a preferred attachment is the use of an L shaped plate having a horizontal leg welded to the top of the corrugated web and to the slope sheet, and having a vertical leg also welded to the slope sheet above and outboard of the first weld. The vertical leg may include an extension having the same inclination as the end slope sheet. The L shaped plate distributes the corrugated web loads over a larger area of the end floor sheet to avoid a stress concentration at one area of the end floor sheet. The L shaped plate also functions as a stiffener for the end floor sheet.

THE DRAWINGS

FIG. 14A is a view looking in the direction of the arrows along the line 14A—14A in FIG. 14;

DESCRIPTION OF THE PRIOR ART

The present invention is an improvement on the covered hopper car structure disclosed and claimed in U.S. Pat. No. 3,490,387 assigned to the assignee of the present application, and hereby incorporated into the present application by this reference.

It is sufficient for an understanding of the present invention to point out that this patent discloses a covered hopper railway car indicated generally at 10. A wheel assembly 12 is provided at each end of car 10. The car body includes a pair of arcuate side sheets 14 struck from a generally constant radius having a center at a substantial distance outside the confines of the car.

Side sheets 14 are generally smooth and do not have any external vertical reinforcements. A side sill 16 is secured along the lower marginal portion of each side sheet 14. A top chord or side plate member 18 is secured along the upper marginal portion of each side sheet 14. An arcuate roof sheet 20 is welded between the top chord member 18. Hatch covers 22 are mounted over suitable openings in roof sheet 20 for loading the railway car.

Intermediate hopper slope sheets 24 are secured between side sheets 14 and form hoppers with side sheets 14 and partitions 26. To discharge ladings from the car, a suitable bottom discharge outlet generally indicated 28 is positioned beneath the bottom discharge opening of each hopper and a movable gate may be opened and closed by a pinion shaft indicated at 30 for the unloading of ladings from the hopper.

Referring now more particularly to FIGS. 4–8, a stub center sill 32 receives a draft gear and coupler structure 34. A rear draft stop 36 secured to the inner surface of stub center sill 32 abuts the rear end of draft gear and coupler structure 34 and transmits forces to the stub center sill from draft gear and coupler structure 34 upon buff and impact loads exerted against the coupler. The bolster assembly generally designated 38 is secured by welding to stub center sill 32 and includes a lower cover plate 40, a center plate 42 mounted thereon, side bearings 43 spaced on either side, a vertical web 44 extending upwardly therefrom, and an upper cover plate 46 over web 44 and extending generally horizontally to the end of the car. An upper bolster web generally indicated 48 is welded along its lower edge to upper cover plate 46 and along its upper edge to an end slope or floor sheet 50. Bolster web 48 is secured along its lateral edges by welding to adjacent side sheets 14. Spaced along the outer face of bolster web 48 are vertically extending channel-shaped reinforcements 52, 54 which extend from upper cover plate 46 to end slope sheet 50. Spaced along the inner face of upper bolster web 48 are corresponding vertical reinforcing members 52a and 54a. Along each side of bolster web 48 on its inner face is a separate channel-shaped reinforcement 56.

End slope sheet 50 extends from the associated outlet structure 28 to an upper end bulkhead 58 which is integrally connected thereto. A stiffener 60 reinforces slope sheet 50 between bulkhead 58 and bolster web 48. An end sill 62 extends transversely of the car at each end thereof between side sills 16. Corner posts 64 extend vertically from end sill 62 to the upper end of the car and a connecting cross member 66 is secured between corner posts 64 to form an end frame for the end of the car.

Figure 2:
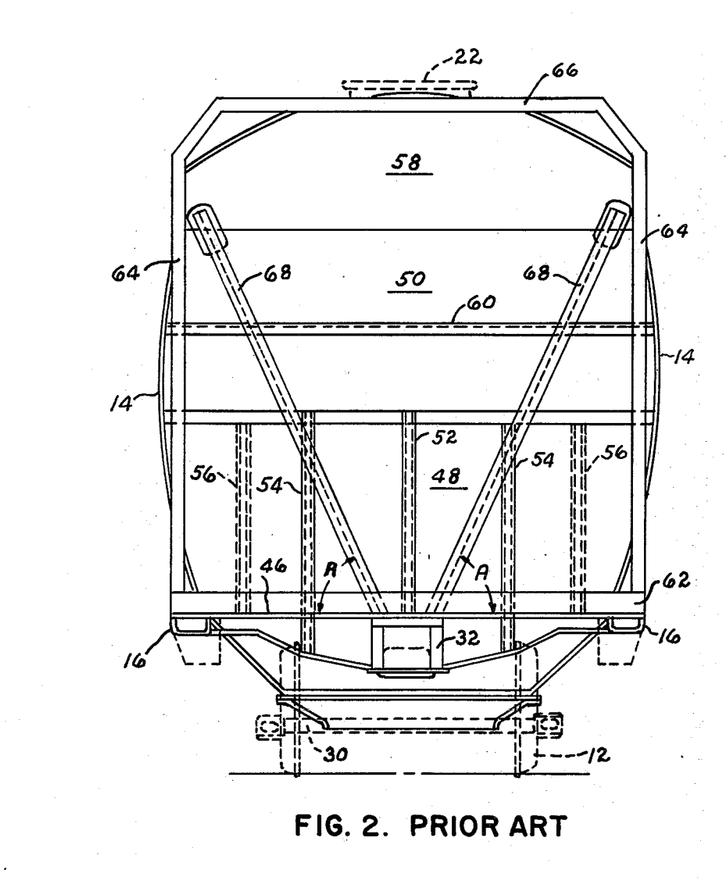
FIG. 2 is an end elevation of the covered hopper railway car shown in FIG. 1.
Figure 3:
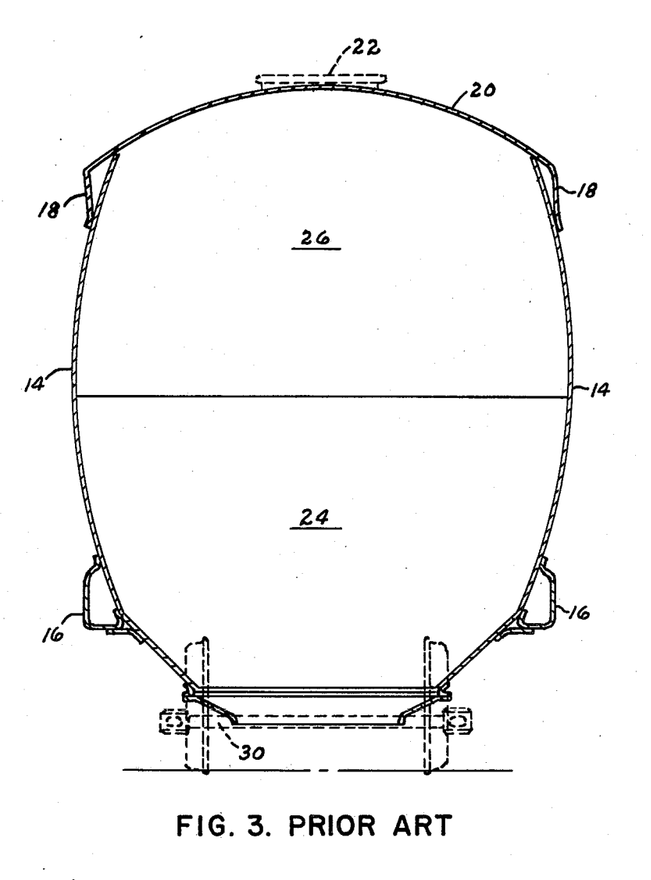
FIG. 3 is a cross-sectional view taken generally along line 3—3 of FIG. 1.
Figures 4, 7:
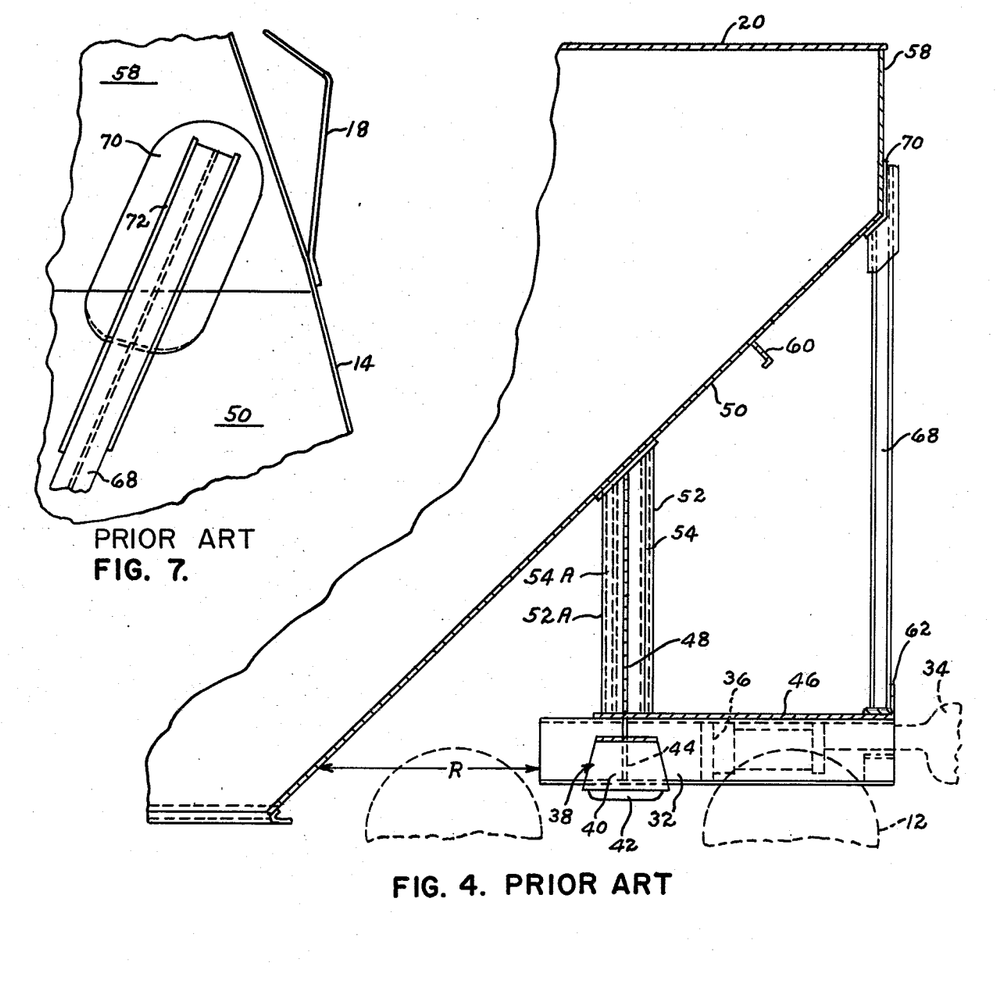
FIG. 4 is an enlarged longitudinal section of the end construction of the covered hopper railway car.
FIG. 7 is an enlarged fragment of FIG. 2 illustrating the attachment of a diagonal strut member to the upper end bulkhead.
Figure 8:
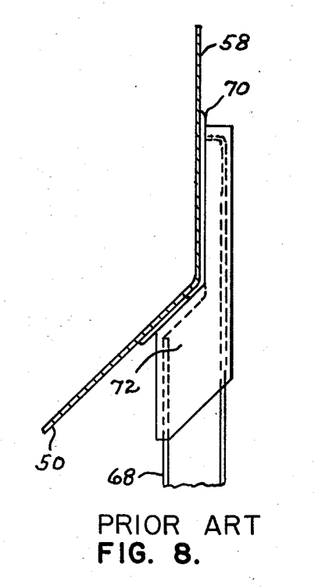
FIG. 8 is a side elevation of the attachment shown in FIG. 7.

A pair of diagonal strut members 68 extend between upper end bulkhead 58 and the associated stub center sill 32 for transmitting loads therebetween. Referring to FIGS. 7 and 8, a reinforcing pad or plate 70 is welded to upper end bulkhead 58 and the adjacent portion of end slope sheet 50. Side reinforcing plates 72 are secured by welding to plate 70 and diagonal strut member 68. The lower ends of diagonal strut members 68 are secured by welding to upper cover plate 46 at a position over stub sill 32 and cover plate 46 is welded to stub center sill 32. If desired, diagonal strut members 68 could be secured directly to stub center sill 32 instead of cover plate 46. Diagonal strut members 68 have their upper ends secured generally at the junctures of end bulkhead 58 and slope sheet 50 adjacent side plates 18, and extend in a generally vertical plane in convergent relation to the associated stub sill 32 at an angle A of around 67° 40' with respect to the horizontal as indicated in FIG. 2.

Figures 1, 9, 10:
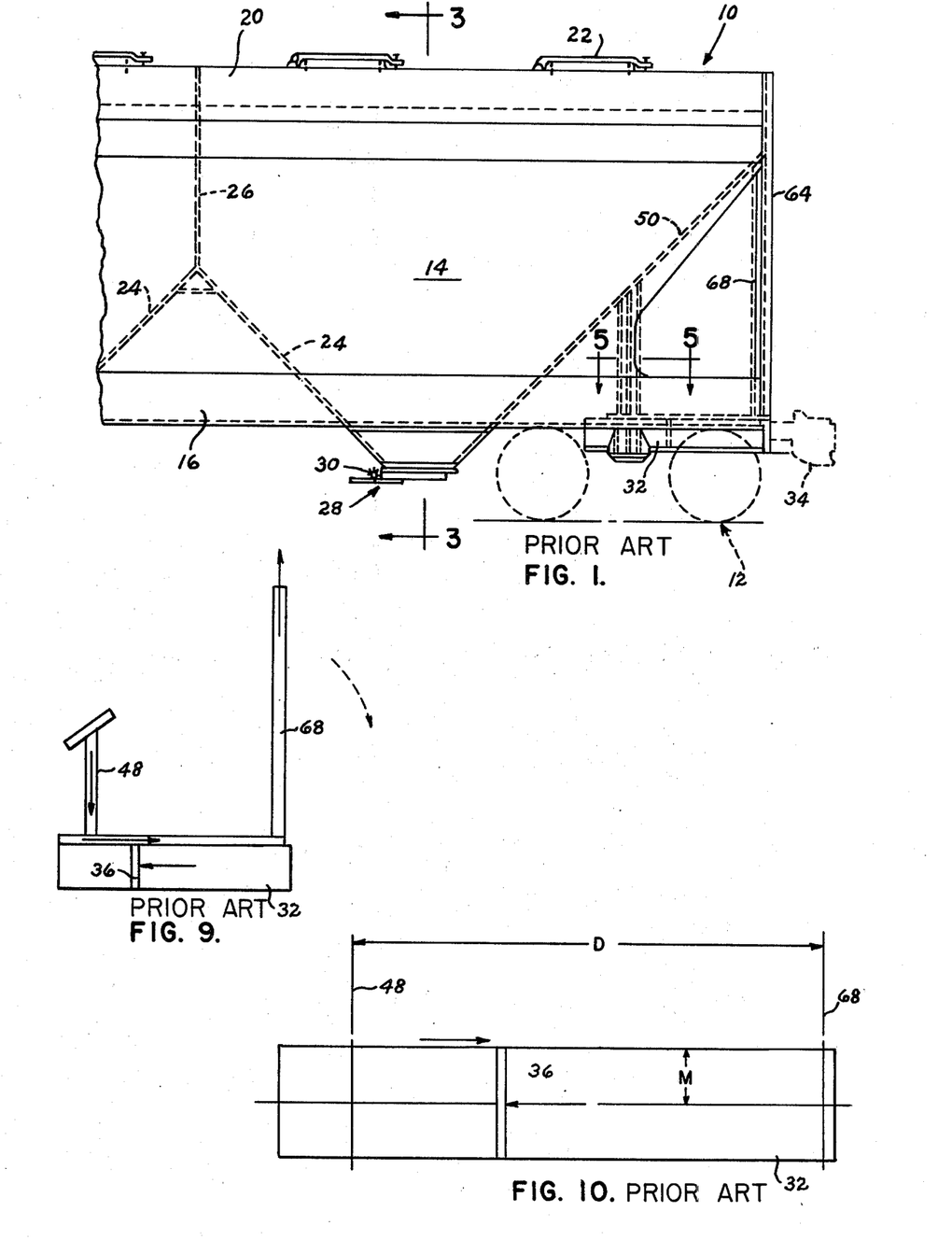
FIG. 1 is a partial side elevation of a covered hopper railway car comprising the prior art.
FIG. 9 is a schematic of the primary load carrying members for transmitting forces upon impact or buff loadings exerted against the coupler and indicating the reaction of the load carrying members of the end construction.
FIG. 10 is a schematic illustrating the couple exerted by the impact forces for computation of the forces generated by the couple.

Referring to FIGS. 9 and 10, the load paths of the forces upon impact loads being exerted against coupler 34 are shown schematically. A moment exists between the center line of the coupler and upper cover plate 46 and this eccentricity tends to rotate the end of the car and stub center sill 32 downwardly upon the exertion of impact forces against the car. The moment is reacted by a couple formed by a compressive force in upper bolster web 48 and a tensile force in diagonal strut members 68.

It has been found from extensive testing of a prototype car having this end structure that the compressive force in upper bolster web 48 is generally equal to the tensile force in diagonal strut members 68, with the diagonal strut members 68 forming substantially the sole tension carrying members and the upper bolster web 48 forming substantially the sole compressive member upon impact forces being exerted against the car. The tensile forces in diagonal strut members 68 are reacted by end bulkhead 58, and thence to side sheets 14 and upper side plates 18.

By having an end structure in which diagonal strut members 68 comprise substantially the entire tension carrying member and bolster web 48 comprises substantially the entire compressive carrying member for reacting the moment generated by impact forces, such forces in the load carrying members can be computed accurately under substantially all conditions of impact and squeeze loadings.

However the welding of channels reinforcements 52, 52a, 54, 54a and 56 to bolster web 48 is time consuming and expensive. This welding incurrs a substantial cost penalty. For example, a typical hopper car has a bolster web about four feet high. Using the reinforcements shown in FIG. 5 of this patent would amount to 16 channels per car. Using two welds, four feet long on each channel equates to about 128 feet of welding per car.

DESCRIPTION OF THE PRESENT INVENTION

In accordance with the present invention the bolster web 48 extending vertically between the stub sill or bolster cover plate and the end hopper slope sheet, and the bolster web reinforcements 52, 52a, 54, 54a and 56 are replaced with a corrugated bolster web 148 (FIG. 11) 1) in which vertically extending corrugations 152, 154, 156 act as reinforcements resulting in a reduction in welding time and cost of production over that required in installing bolster web 48. The corrugated bolster web 148 is welded to cover plate 46 or stub sill 32, extending transversely of the car, along the center line 45 of center plate 42 and is connected to slope sheet 50 as described hereinafter.

Figure 11:
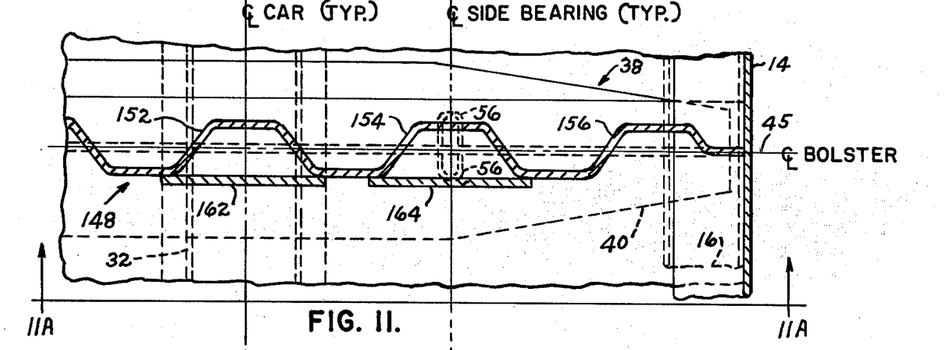
FIG. 11 is a sectional view of one embodiment of the corrugated bolster web.
Figure 11A:
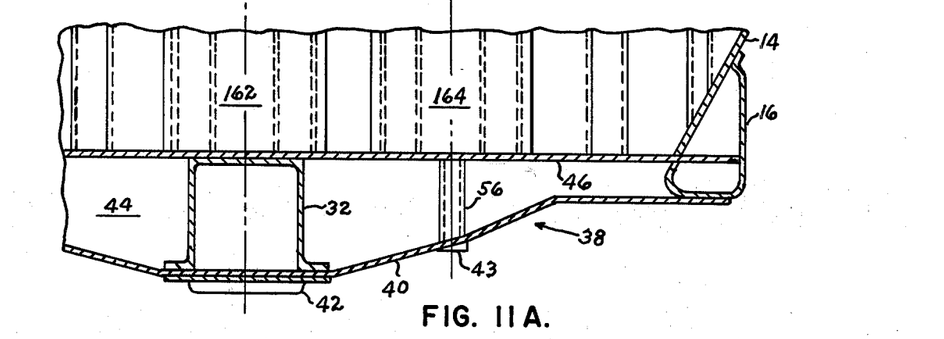
FIG. 11A is a partial vertical section looking in the direction of the arrows along the line 11A—11A in FIG. 11.

The corrugation 152 located above the center plate 42 is preferably provided with vertical closure plate 162 to close the open side of the corrugation because of the high forces which occur at the center plate when the car is impacted.

The side bearings 43 are also highly stressed while resisting transverse rocking.

Furthermore, the reaction point of the truck side bearing on the car side bearing 43 moves several inches inboard and outboard of the car side bearing longitudinal center line as the truck swivels horizontally to negotiate a curve. This imposes a force which is eccentric to the side bearing longitudinal center line, causing a bending moment in the structure. To resist this moment, load bearing structure is needed at or very near the point of application of the side bearing force. Vertical closure plates 164 may be welded to the open side of the corrugations 154 extending vertically above the side bearings.

However, placing a closure plate on the open side of the corrugation as shown in FIG. 11 incurs the added cost and weight of the plate and the attaching welds.

Figure 12:
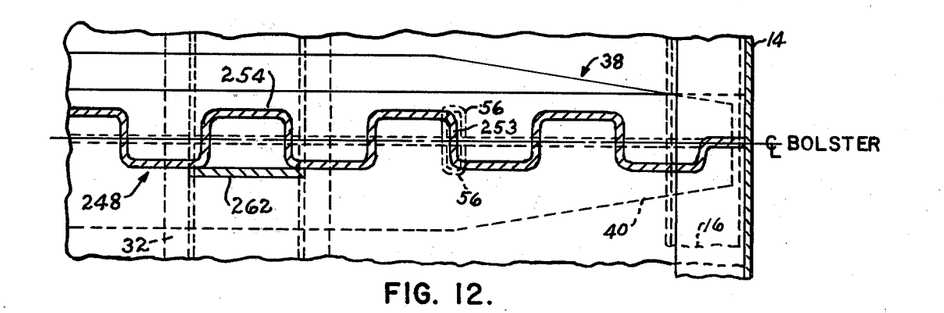
FIG. 12 is a sectional view of another embodiment of the corrugated bolster web.

A less expensive embodiment shown in FIG. 12 is to provide a corrugated bolster 248 in which the web 253 of the vertically extending corrugation 254 is located above the side bearing 43 along the longitudinal axis of the side bearing at or near the center line of the side bearing. This eliminates welding in place closure plates above the side bearings. A closure plate 262 is provided above the center plate.

Figure 13:
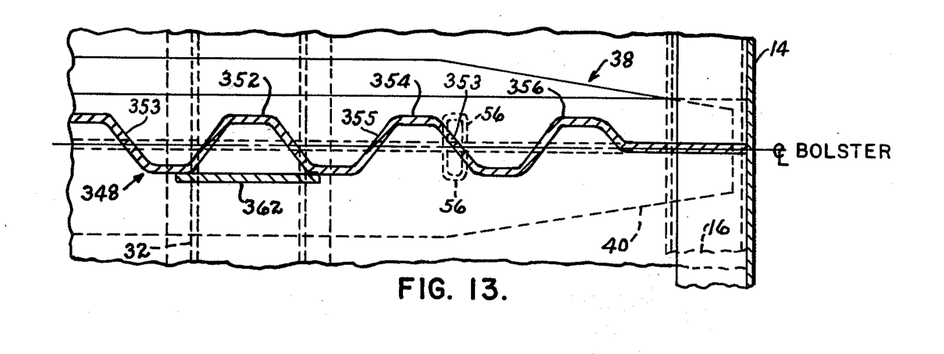
FIG. 13 is a sectional view of another embodiment of the corrugated bolster web.

Another less expensive embodiment is to provide a corrugated bolster web 348 in whih the corrugation web 353 over the side bearing is askew to the longitudinal center line of the side bearing as shown in FIG. 13. This allows the corrugations 352, 354, 356 to have the same general contour and have angularity at portions 353, 355 which simplifies the corrugation forming operation. A closure plate 362 is provided above the center plate.

Figure 14:
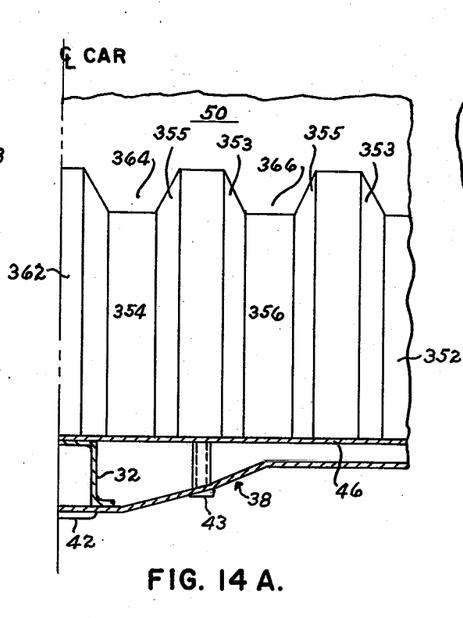
FIG. 14 is a side elevation view illustrating coping the corrugated bolster web to fit the sloping end sheet.

The corrugated bolster web may be attached to the end floor sheet by coping the top of the corrugated web as indicated at 364 and 366 to match the slope of the end floor sheet as shown in FIGS. 14 and 14A.

Figure 15:
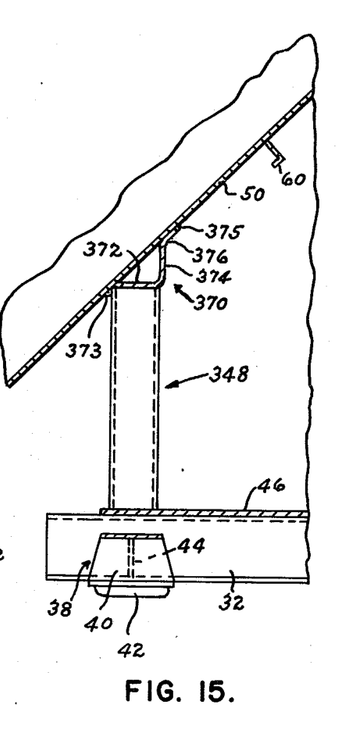
FIG. 15 is a side elevation view illustrating the corrugated bolster web and an L shaped attachment plate.

However a preferred attachment shown in FIG. 15 is the use of an L shaped plate 370 having a horizontal leg 372 welded to the top of the corrugated web 348 and to the slope sheet 50 at 373, and having a vertical leg 374 also welded to the slope sheet at 375 above and outboard of the first weld 373. The vertical leg may include an extension 376 having the same inclination as the end slope sheet 50. The L shaped plate 370 distributes the corrugated web loads over a larger area of the end floor sheet 50 to avoid a stress concentration at one area of the end floor sheet. The L shaped plate also functions as a stiffener for the end floor sheet 50.

What is claimed is:

1. In a hopper railway car having a separate stub center sill structure adjacent each end of the car, transversely spaced side sheets located on each side of the car, a side sill secured to the lower portion of each side sheet, an end sill at each end of the car extending transversely of the car between the side sills and over the adjacent stub center sill structure, a plurality of hoppers spaced at intervals along the length of the car extending between said side sills; a body bolster assembly at each end of the car secured to the adjacent stub center sill structure and including a lower bolster cover plate having a center plate and side bearings mounted thereon; an end slope sheet for each end hopper extending upwardly and inwardly from the inner end of the adjacent stub center sill structure toward the end of the car to provide each end hopper with an overhanging hopper portion, a vertically extending end bulkhead extending transversely between said side sheets, located at the upper end of said end slope sheet; a pair of external load carrying members at each end of the car having upper ends secured to said end bulkhead generally adjacent said side sheets and extending downwardly from said upper ends to the associated stub center sill structure, said pair of load carrying members constituting the tension carrying members for reacting a moment tending to rotate the outer end of the stub center sill structure downwardly upon impact forces being exerted against the railway car, the improvement comprising: a vertically extending corrugated bolster web secured between said body bolster and said end slope sheet and extending transversely of the car between said side sheets, said bolster web being secured along its lateral edges to said side sill and side sheets; said bolster web comprising a plurality of vertically extending corrugations; at least one center corrugation located above said center plate having an open side, and a pair of side corrugations located above each of said side bearings; said corrugated bolster web constituting the compression carrying member for reacting said moment.

2. A hopper railway car as set forth in claim 1 wherein a vertical plate closes the opening in said center corrugation.

3. A hopper railway car as set forth in claim 2 wherein a vertical plate closes a corrugation opening above each of said side bearings.

4. A hopper railway car as set forth in claim 2 wherein a web of each of said side corrugations is located generally along the longitudinal center line of the side bearing, parallel to the longitudinal axis of the car.

5. A hopper railway car as set forth in claim 2 wherein a web of each of said side corrugations is located askew to the longitudinal center line of the side bearing.

6. A hopper railway car as set forth in claim 5 wherein said corrugations include in plan view inclined portions located on either side of transverse portions generally perpendicular to the longitudinal axis of the car and wherein one of said inclined portions is askew to the longitudinal center line of each side bearing.

7. A hopper railway car as set forth in claim 6 wherein said corrugated bolster web is coped at the top to conform to the shape of said end slope sheet.

8. A hopper railway car as set forth in claim 2 wherein a top plate is welded to the top of said corrugated bolster web and to said end slope sheet.

9. A hopper railway car as set forth in claim 8 wherein said top plate is L-shaped with one leg extending generally horizontally above said corrugated bolster web and is welded to said end slope sheet at its inner end, and the other leg extends generally vertically and is welded to said end slope sheet above and outboard of where the horizontal leg is welded to the end slope sheet.

10. In a covered hopper railway car having a separate stub center sill structure adjacent each end of the car, a side sheet located on each side of the car, a side sill secured along the outer surface of the lower portion of each side sheet, a roof extending transversely of the car between the side sills and over the adjacent stub center sill structure, a plurality of hoppers spaced at intervals along the length of the car, a bottom hopper outlet structure for each hopper positioned centrally of the width of the car, a body bolster assembly at each end of the car secured to the adjacent stub center sill structure and including a lower bolster cover plate having a center plate and side bearings mounted thereon and a generally horizontally extending bolster upper cover plate over the subjacent center sill structure extending between and secured to the side sills, an end slope sheet for each end hopper extending upwardly from its associated bottom outlet structure inwardly of the inner end of the adjacent stub center sill structure toward the end of the car to provide each end hopper with an overhanging hopper portion, an end bulkhead secured between said side sheets, a pair of external load carrying members at each end of the car having upper ends secured to the end bulkhead generally adjacent said top chord members and extending downwardly from said upper ends to the associated stub center sill structure, said pair of load carrying members constituting the tension carrying members for reacting a moment tending to rotate the outer end of the stub center sill structure downwardly upon impact forces being exerted against the railway car, the improvement comprising:

a vertically extending corrugated bolster web secured between said body bolster and said end slope sheet and extending transversely of the car between said side sheets and said side wills, said bolster web being secured along its lateral edges to said side sills and said side sheets; said bolster web comprising a plurality of vertically extending corrugations; said corrugated bolster web constituting the compression carrying member for reacting said moment; at least one center corrugation located above said center plate having an open side; a vertical plate closing said opening above said center plate; and a pair of side corrugations each located above one of said side bearings, each of said side corrugations having a web portion extending vertically above the longitudinal center line of each side bearing.

11. A covered hopper railway car as set forth in claim 10 wherein said corrugated bolster web is coped at the top to conform to the shape of said end slope sheet.

12. A covered hopper railway car as set forth in claim 10 wherein a web of each of said side corrugations is located generally along the longitudinal center line of the side bearing, parallel to the longitudinal axis of the car.

13. A covered hopper railway car as set forth in claim 10 wherein a web of each of said side corrugations is located generally askew to the longitudinal axis of the car.

14. A covered hopper railway car as set forth in claim 13 wherein said corrugations include in plane view inclined portions located on either side of transverse portions generally perpendicular to the longitudinal axis of the car and wherein one of said inclined portions are askew to the longitudinal center line of each side bearing.

15. A covered hopper railway car as set forth in claim 10 wherein a top plate is welded to the top of said corrugated bolster web and to said end slope sheet.

16. A covered hopper railway car as set forth in claim 15 wherein said top plate is L shaped with one leg extending generally horizontally above said corrugated bolster web and is welded to said end slope sheet at its inner end, and the other leg extends generally vertically and is welded to said end slope sheet above and outboard of where the horizontal leg is welded to the end slope sheet.

* * * * *

UNITED STATES PATENT AND TRADEMARK OFFICE
CERTIFICATE OF CORRECTION

PATENT NO. : 4,168,665

DATED : September 25, 1979

INVENTOR(S) : Robert F. Needham and Robert W. Randolph

It is certified that error appears in the above-identified patent and that said Letters Patent are hereby corrected as shown below:

Col. 3, line 12, "member" should read --members--.
Col. 4, line 10, after "moment" insert --arm M of around six (6) inches--.
      line 38, "incurrs" should read --incurs--.
      line 52, after "11)" delete "1)".
Col. 5, line 23, "whih" should read --which--.
Col. 7, claim 10, line 21, "wills" should read --sills--.
Col. 8, claim 18, line 19, "are" should read --is--.

Signed and Sealed this

Eleventh Day of December 1979

[SEAL]

Attest:

SIDNEY A. DIAMOND

*Attesting Officer*  *Commissioner of Patents and Trademarks*